US008787725B2

(12) United States Patent
Lee

(10) Patent No.: US 8,787,725 B2
(45) Date of Patent: Jul. 22, 2014

(54) SYSTEMS AND METHODS FOR MANAGING VIDEO DATA

(75) Inventor: Martin Lee, Lane Cove (AU)

(73) Assignee: Honeywell International Inc., Morristown, NJ (US)

(*) Notice: Subject to any disclaimer, the term of this patent is extended or adjusted under 35 U.S.C. 154(b) by 221 days.

(21) Appl. No.: 13/292,992

(22) Filed: Nov. 9, 2011

(65) Prior Publication Data

US 2012/0121229 A1 May 17, 2012

(51) Int. Cl.
*H04N 5/77* (2006.01)

(52) U.S. Cl.
USPC .......................................... 386/224; 348/143

(58) Field of Classification Search
CPC .......... H04N 5/00; H04N 5/765; H04N 7/00; H04N 7/185
USPC .................................... 386/200, 223; 348/143
See application file for complete search history.

(56) References Cited

U.S. PATENT DOCUMENTS

| | | |
|---|---|---|
| 3,753,232 A | 8/1973 | Sporer |
| 3,806,911 A | 4/1974 | Pripusich |
| 3,857,018 A | 12/1974 | Stark et al. |
| 3,860,911 A | 1/1975 | Hinman et al. |
| 3,866,173 A | 2/1975 | Moorman et al. |
| 3,906,447 A | 9/1975 | Crafton |
| 4,095,739 A | 6/1978 | Fox et al. |
| 4,146,085 A | 3/1979 | Wills |
| 4,148,012 A | 4/1979 | Baump et al. |
| 4,161,778 A | 7/1979 | Getson, Jr. et al. |
| 4,213,118 A | 7/1980 | Genest et al. |
| 4,283,710 A | 8/1981 | Genest et al. |
| 4,298,946 A | 11/1981 | Hartsell et al. |
| 4,332,852 A | 6/1982 | Korklan et al. |
| 4,336,902 A | 6/1982 | Neal |
| 4,337,893 A | 7/1982 | Flanders et al. |
| 4,353,064 A | 10/1982 | Stamm |

(Continued)

FOREIGN PATENT DOCUMENTS

| | | |
|---|---|---|
| CA | 2240881 | 12/1999 |
| CN | 1265762 A | 9/2000 |

(Continued)

OTHER PUBLICATIONS

"Certificate Validation Choices," CoreStreet, Inc., 8 pages, 2002.

(Continued)

*Primary Examiner* — Huy T Nguyen
(74) *Attorney, Agent, or Firm* — Seager Tufte Wickhem LLC

(57) ABSTRACT

Described herein are systems and methods for managing video data. Embodiments are described by reference to a Digital Video Management (DVM) system, for example methods for controlling a DVM system. In overview, the present technology relates to the ability of an operator to modify a system alert level in the context of a DVM system, thereby to reduce the need for manual interaction in times of high alert. This may be achieved by implementing a system alert level controller via a graphical user interface. Increasing the system alert level, at least in some embodiments, correspondingly increases system resource consumption, for example by automating various actions (such as record) or increasing the amount/quality of recordings made. In effect, the system is temporarily operated on a high-cost basis thereby to assist manage risk during times of high alert by reducing reliance on the operator.

20 Claims, 3 Drawing Sheets

(56) References Cited

U.S. PATENT DOCUMENTS

| | | |
|---|---|---|
| 4,373,664 A | 2/1983 | Barker et al. |
| 4,379,483 A | 4/1983 | Farley |
| 4,462,028 A | 7/1984 | Ryan et al. |
| 4,525,777 A | 6/1985 | Webster et al. |
| 4,538,056 A | 8/1985 | Young et al. |
| 4,556,169 A | 12/1985 | Zervos |
| 4,628,201 A | 12/1986 | Schmitt |
| 4,646,964 A | 3/1987 | Parker et al. |
| 4,685,615 A | 8/1987 | Hart |
| 4,821,177 A | 4/1989 | Koegel et al. |
| 4,847,839 A | 7/1989 | Hudson, Jr. et al. |
| 5,070,468 A | 12/1991 | Niinomi et al. |
| 5,071,065 A | 12/1991 | Aalto et al. |
| 5,099,420 A | 3/1992 | Barlow et al. |
| 5,172,565 A | 12/1992 | Wruck et al. |
| 5,204,663 A | 4/1993 | Lee |
| 5,227,122 A | 7/1993 | Scarola et al. |
| 5,259,553 A | 11/1993 | Shyu |
| 5,271,453 A | 12/1993 | Yoshida et al. |
| 5,361,982 A | 11/1994 | Liebl et al. |
| 5,404,934 A | 4/1995 | Carlson et al. |
| 5,420,927 A | 5/1995 | Micali |
| 5,449,112 A | 9/1995 | Heitman et al. |
| 5,465,082 A | 11/1995 | Chaco |
| 5,479,154 A | 12/1995 | Wolfram |
| 5,481,481 A | 1/1996 | Frey et al. |
| 5,526,871 A | 6/1996 | Musser et al. |
| 5,541,585 A | 7/1996 | Duhame et al. |
| 5,591,950 A | 1/1997 | Imedio-Ocana |
| 5,594,429 A | 1/1997 | Nakahara |
| 5,604,804 A | 2/1997 | Micali |
| 5,610,982 A | 3/1997 | Micali |
| 5,631,825 A | 5/1997 | van Weele et al. |
| 5,640,151 A | 6/1997 | Reis et al. |
| 5,644,302 A | 7/1997 | Hana et al. |
| 5,663,957 A | 9/1997 | Dent |
| 5,666,416 A | 9/1997 | Micali |
| 5,717,757 A | 2/1998 | Micali |
| 5,717,758 A | 2/1998 | Micall |
| 5,717,759 A | 2/1998 | Micali |
| 5,732,691 A | 3/1998 | Maiello et al. |
| 5,774,058 A | 6/1998 | Henry et al. |
| 5,778,256 A | 7/1998 | Darbee |
| 5,793,868 A | 8/1998 | Micali |
| 5,914,875 A | 6/1999 | Monta et al. |
| 5,915,473 A | 6/1999 | Ganesh et al. |
| 5,923,817 A | 7/1999 | Nakamura |
| 5,927,398 A | 7/1999 | Maciulewicz |
| 5,930,773 A | 7/1999 | Crooks et al. |
| 5,960,083 A | 9/1999 | Micali |
| 5,973,613 A | 10/1999 | Reis et al. |
| 5,992,194 A | 11/1999 | Baukholt et al. |
| 6,072,402 A | 6/2000 | Kniffin et al. |
| 6,097,811 A | 8/2000 | Micali |
| 6,104,963 A | 8/2000 | Cebasek et al. |
| 6,119,125 A | 9/2000 | Gloudeman et al. |
| 6,141,595 A | 10/2000 | Gloudeman et al. |
| 6,149,065 A | 11/2000 | White et al. |
| 6,154,681 A | 11/2000 | Drees et al. |
| 6,167,316 A | 12/2000 | Gloudeman et al. |
| 6,233,954 B1 | 5/2001 | Mehaffey et al. |
| 6,241,156 B1 | 6/2001 | Kline et al. |
| 6,249,755 B1 | 6/2001 | Yemini et al. |
| 6,260,765 B1 | 7/2001 | Natale et al. |
| 6,268,797 B1 | 7/2001 | Berube et al. |
| 6,292,893 B1 | 9/2001 | Micali |
| 6,301,659 B1 | 10/2001 | Micali |
| 6,318,137 B1 | 11/2001 | Chaum |
| 6,324,854 B1 | 12/2001 | Jayanth |
| 6,334,121 B1 | 12/2001 | Primeaux et al. |
| 6,347,374 B1 | 2/2002 | Drake et al. |
| 6,366,558 B1 | 4/2002 | Howes et al. |
| 6,369,719 B1 | 4/2002 | Tracy et al. |
| 6,374,356 B1 | 4/2002 | Daigneault et al. |
| 6,393,848 B2 | 5/2002 | Roh et al. |
| 6,394,359 B1 | 5/2002 | Morgan |
| 6,424,068 B2 | 7/2002 | Nakagishi |
| 6,453,426 B1 | 9/2002 | Gamache et al. |
| 6,453,687 B2 | 9/2002 | Sharood et al. |
| 6,483,697 B1 | 11/2002 | Jenks et al. |
| 6,487,658 B1 | 11/2002 | Micali |
| 6,490,610 B1 | 12/2002 | Rizvi et al. |
| 6,496,575 B1 | 12/2002 | Vasell et al. |
| 6,516,357 B1 | 2/2003 | Hamann et al. |
| 6,518,953 B1 | 2/2003 | Armstrong |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,583,712 B1 | 6/2003 | Reed et al. |
| 6,604,023 B1 | 8/2003 | Brown et al. |
| 6,615,594 B2 | 9/2003 | Jayanth et al. |
| 6,628,997 B1 | 9/2003 | Fox et al. |
| 6,647,317 B2 | 11/2003 | Takai et al. |
| 6,647,400 B1 | 11/2003 | Moran |
| 6,658,373 B2 | 12/2003 | Rossi et al. |
| 6,663,010 B2 | 12/2003 | Chene et al. |
| 6,665,669 B2 | 12/2003 | Han et al. |
| 6,667,690 B2 | 12/2003 | Durej et al. |
| 6,741,915 B2 | 5/2004 | Poth |
| 6,758,051 B2 | 7/2004 | Jayanth et al. |
| 6,766,450 B2 | 7/2004 | Micali |
| 6,789,739 B2 | 9/2004 | Rosen |
| 6,796,494 B1 | 9/2004 | Gonzalo |
| 6,801,849 B2 | 10/2004 | Szukala et al. |
| 6,801,907 B1 | 10/2004 | Zagami |
| 6,826,454 B2 | 11/2004 | Sulfstede |
| 6,829,332 B2 | 12/2004 | Farris et al. |
| 6,851,621 B1 | 2/2005 | Wacker et al. |
| 6,871,193 B1 | 3/2005 | Campbell et al. |
| 6,886,742 B2 | 5/2005 | Stoutenburg et al. |
| 6,895,215 B2 | 5/2005 | Uhlmann |
| 6,910,135 B1 | 6/2005 | Grainger |
| 6,967,612 B1 | 11/2005 | Gorman et al. |
| 6,969,542 B2 | 11/2005 | Klasen-Memmer et al. |
| 6,970,070 B2 | 11/2005 | Juels et al. |
| 6,973,410 B2 | 12/2005 | Seigel |
| 6,983,889 B2 | 1/2006 | Alles |
| 6,989,742 B2 | 1/2006 | Ueno et al. |
| 7,004,401 B2 | 2/2006 | Kallestad |
| 7,019,614 B2 | 3/2006 | Lavelle et al. |
| 7,032,114 B1 | 4/2006 | Moran |
| 7,055,759 B2 | 6/2006 | Wacker et al. |
| 7,076,083 B2 | 7/2006 | Blazey |
| 7,117,356 B2 | 10/2006 | LaCous |
| 7,124,943 B2 | 10/2006 | Quan et al. |
| 7,130,719 B2 | 10/2006 | Ehlers et al. |
| 7,183,894 B2 | 2/2007 | Yui et al. |
| 7,203,962 B1 | 4/2007 | Moran |
| 7,205,882 B2 | 4/2007 | Libin |
| 7,216,007 B2 | 5/2007 | Johnson |
| 7,216,015 B2 | 5/2007 | Poth |
| 7,218,243 B2 | 5/2007 | Hayes et al. |
| 7,222,800 B2 | 5/2007 | Wruck |
| 7,233,243 B2 | 6/2007 | Roche et al. |
| 7,243,001 B2 | 7/2007 | Janert et al. |
| 7,245,223 B2 | 7/2007 | Trela |
| 7,250,853 B2 | 7/2007 | Flynn |
| 7,274,676 B2 | 9/2007 | Cardei et al. |
| 7,283,489 B2 | 10/2007 | Palaez et al. |
| 7,313,819 B2 | 12/2007 | Burnett et al. |
| 7,321,784 B2 | 1/2008 | Serceki et al. |
| 7,337,315 B2 | 2/2008 | Micali |
| 7,343,265 B2 | 3/2008 | Andarawis et al. |
| 7,353,396 B2 | 4/2008 | Micali et al. |
| 7,362,210 B2 | 4/2008 | Bazakos et al. |
| 7,376,839 B2 | 5/2008 | Carta et al. |
| 7,379,997 B2 | 5/2008 | Ehlers et al. |
| 7,380,125 B2 | 5/2008 | Di Luoffo et al. |
| 7,383,158 B2 | 6/2008 | Krocker et al. |
| 7,397,371 B2 | 7/2008 | Martin et al. |
| 7,408,925 B1 | 8/2008 | Boyle et al. |
| 7,487,538 B2 | 2/2009 | Mok |
| 7,505,914 B2 | 3/2009 | McCall |
| 7,542,867 B2 | 6/2009 | Steger et al. |

(56) References Cited

U.S. PATENT DOCUMENTS

| | | |
|---|---|---|
| 7,543,327 B1 | 6/2009 | Kaplinsky |
| 7,574,734 B2 | 8/2009 | Fedronic et al. |
| 7,576,770 B2 | 8/2009 | Metzger et al. |
| 7,583,401 B2 | 9/2009 | Lewis |
| 7,586,398 B2 | 9/2009 | Huang et al. |
| 7,600,679 B2 | 10/2009 | Kshirsagar et al. |
| 7,634,662 B2 | 12/2009 | Monroe |
| 7,661,603 B2 | 2/2010 | Yoon et al. |
| 7,683,940 B2 | 3/2010 | Fleming |
| 7,735,132 B2 | 6/2010 | Brown et al. |
| 7,735,145 B2 | 6/2010 | Kuehnel et al. |
| 7,794,536 B2 | 9/2010 | Roy et al. |
| 7,801,870 B2 | 9/2010 | Oh et al. |
| 7,818,026 B2 | 10/2010 | Hartikainen et al. |
| 7,839,926 B1 | 11/2010 | Metzger et al. |
| 7,853,987 B2 | 12/2010 | Balasubramanian et al. |
| 7,861,314 B2 | 12/2010 | Serani et al. |
| 7,873,441 B2 | 1/2011 | Synesiou et al. |
| 7,907,753 B2 | 3/2011 | Wilson et al. |
| 7,937,669 B2 | 5/2011 | Zhang et al. |
| 7,983,892 B2 | 7/2011 | Anne et al. |
| 7,995,526 B2 | 8/2011 | Liu et al. |
| 8,045,960 B2 | 10/2011 | Orakkan |
| 8,069,144 B2 | 11/2011 | Quinlan et al. |
| 8,089,341 B2 | 1/2012 | Nakagawa et al. |
| 8,095,889 B2 | 1/2012 | DeBlaey et al. |
| 8,199,196 B2 | 6/2012 | Klein et al. |
| 8,474,029 B2 | 6/2013 | Adams et al. |
| 8,509,987 B2 | 8/2013 | Resner |
| 8,560,970 B2 | 10/2013 | Liddington |
| 8,605,151 B2 | 12/2013 | Bellamy et al. |
| 2002/0011923 A1 | 1/2002 | Cunningham et al. |
| 2002/0022991 A1 | 2/2002 | Sharood et al. |
| 2002/0046337 A1 | 4/2002 | Micali |
| 2002/0118096 A1 | 8/2002 | Hoyos et al. |
| 2002/0121961 A1 | 9/2002 | Huff |
| 2002/0165824 A1 | 11/2002 | Micali |
| 2002/0170064 A1 | 11/2002 | Monroe et al. |
| 2003/0033230 A1 | 2/2003 | McCall |
| 2003/0071714 A1 | 4/2003 | Bayer et al. |
| 2003/0174049 A1 | 9/2003 | Beigel et al. |
| 2003/0208689 A1 | 11/2003 | Garza |
| 2003/0233432 A1 | 12/2003 | Davis et al. |
| 2004/0062421 A1 | 4/2004 | Jakubowski et al. |
| 2004/0064453 A1 | 4/2004 | Ruiz et al. |
| 2004/0068583 A1 | 4/2004 | Monroe et al. |
| 2004/0087362 A1 | 5/2004 | Beavers |
| 2004/0205350 A1 | 10/2004 | Waterhouse et al. |
| 2005/0138380 A1 | 6/2005 | Fedronic et al. |
| 2005/0200714 A1 | 9/2005 | Marchese |
| 2006/0017939 A1 | 1/2006 | Jamieson et al. |
| 2006/0059557 A1 | 3/2006 | Markham et al. |
| 2006/0225120 A1* | 10/2006 | Lee et al. ............... 725/131 |
| 2007/0109098 A1 | 5/2007 | Siemon et al. |
| 2007/0132550 A1 | 6/2007 | Avraham et al. |
| 2007/0171862 A1 | 7/2007 | Tang et al. |
| 2007/0268145 A1 | 11/2007 | Bazakos et al. |
| 2007/0272744 A1 | 11/2007 | Bantwal et al. |
| 2008/0086758 A1 | 4/2008 | Chowdhury et al. |
| 2008/0173709 A1 | 7/2008 | Ghosh |
| 2008/0272881 A1 | 11/2008 | Goel |
| 2009/0002157 A1* | 1/2009 | Donovan et al. ........... 340/540 |
| 2009/0018900 A1 | 1/2009 | Waldron et al. |
| 2009/0080443 A1 | 3/2009 | Dziadosz |
| 2009/0086692 A1 | 4/2009 | Chen |
| 2009/0097815 A1 | 4/2009 | Lahr et al. |
| 2009/0121830 A1 | 5/2009 | Dziadosz |
| 2009/0167485 A1 | 7/2009 | Birchbauer et al. |
| 2009/0168695 A1 | 7/2009 | Johar et al. |
| 2009/0258643 A1 | 10/2009 | McGuffin |
| 2009/0266885 A1 | 10/2009 | Marcinowski et al. |
| 2009/0292524 A1 | 11/2009 | Anne et al. |
| 2009/0292995 A1 | 11/2009 | Anne et al. |
| 2009/0292996 A1 | 11/2009 | Anne et al. |
| 2009/0328152 A1 | 12/2009 | Thomas et al. |
| 2009/0328203 A1 | 12/2009 | Haas |
| 2010/0026811 A1* | 2/2010 | Palmer ..................... 348/159 |
| 2010/0036511 A1 | 2/2010 | Dongare |
| 2010/0148918 A1 | 6/2010 | Gerner et al. |
| 2010/0164720 A1 | 7/2010 | Kore |
| 2010/0220715 A1 | 9/2010 | Cherchali et al. |
| 2010/0269173 A1 | 10/2010 | Srinivasa et al. |
| 2011/0038278 A1 | 2/2011 | Bhandari et al. |
| 2011/0043631 A1 | 2/2011 | Marman et al. |
| 2011/0071929 A1 | 3/2011 | Morrison |
| 2011/0115602 A1 | 5/2011 | Bhandari et al. |
| 2011/0133884 A1 | 6/2011 | Kumar et al. |
| 2011/0153791 A1 | 6/2011 | Jones et al. |
| 2011/0167488 A1 | 7/2011 | Roy et al. |
| 2011/0181414 A1 | 7/2011 | G. et al. |
| 2012/0096131 A1 | 4/2012 | Bhandari et al. |
| 2012/0106915 A1 | 5/2012 | Palmer |
| 2012/0121119 A1 | 5/2012 | Lee |
| 2012/0133482 A1 | 5/2012 | Bhandari et al. |

FOREIGN PATENT DOCUMENTS

| | | |
|---|---|---|
| DE | 19945861 | 3/2001 |
| EP | 0043270 | 1/1982 |
| EP | 0122244 | 10/1984 |
| EP | 0152678 | 8/1985 |
| EP | 0629940 | 12/1994 |
| EP | 0858702 | 4/2002 |
| EP | 1339028 | 8/2003 |
| EP | 1630639 | 3/2006 |
| GB | 2251266 | 7/1992 |
| GB | 2390705 | 1/2004 |
| JP | 6019911 | 1/1994 |
| JP | 2003/074942 | 3/2003 |
| JP | 2003/240318 | 8/2003 |
| WO | WO 84/02786 | 7/1984 |
| WO | WO 94/19912 | 9/1994 |
| WO | WO 96/27858 | 9/1996 |
| WO | WO 00/11592 | 3/2000 |
| WO | 0076220 A1 | 12/2000 |
| WO | WO 01/42598 | 6/2001 |
| WO | WO 01/57489 | 8/2001 |
| WO | WO 01/60024 | 8/2001 |
| WO | WO 02/32045 | 4/2002 |
| WO | WO 02/091311 | 11/2002 |
| WO | WO 03/090000 | 10/2003 |
| WO | WO 2004/092514 | 10/2004 |
| WO | WO 2005/038727 | 4/2005 |
| WO | WO 2006/021047 | 3/2006 |
| WO | WO 2006/049181 | 5/2006 |
| WO | 2006126974 A1 | 11/2006 |
| WO | 2007043798 A1 | 4/2007 |
| WO | WO 2008/045918 | 4/2008 |
| WO | WO 2008/144803 | 12/2008 |
| WO | WO 2010/039598 | 4/2010 |
| WO | WO 2010/106474 | 9/2010 |

OTHER PUBLICATIONS

"CoreStreet Cuts the PKI Gordian Knot," Digital ID World, pp. 22-25, Jun./Jul. 2004.

"Distributed Certificate Validation," CoreStreet, Ltd., 17 pages, 2006.

"Identity Services Infrastructure," CoreStreet Solutions—Whitepaper, 12 pages, 2006.

"Important FIPS 201 Deployment Considerations," Corestreet Ltd—Whitepaper, 11 pages, 2005.

"Introduction to Validation for Federated PKI," Corestreet Ltd, 20 pages, 2006.

"Manageable Secure Physical Access," Corestreet Ltd, 3 pages, 2002.

"MiniCRL, Corestreet Technology Datasheet," CoreStreet, 1 page, 2006.

"Nonce Sense, Freshness and Security in OCSP Responses," Corestreet Ltd, 2 pages, 2003.

"Real Time Credential Validation, Secure, Efficient Permissions Management," Corestreet Ltd, 5 pages, 2002.

(56) References Cited

OTHER PUBLICATIONS

"The Role of Practical Validation for Homeland Security," Corestreet Ltd, 3 pages, 2002.
"The Roles of Authentication, Authorization & Cryptography in Expanding Security Industry Technology," Security Industry Association (SIA), Quarterly Technical Update, 32 pages, Dec. 2005.
"Vulnerability Analysis of Certificate Validation Systems," Corestreet Ltd—Whitepaper, 14 pages, 2006.
Goldman et al., "Information Modeling for Intrusion Report Aggregation," IEEE, Proceedings DARPA Information Survivability Conference and Exposition II, pp. 329-342, 2001.
Honeywell, "Excel Building Supervisor-Integrated R7044 and FS90 Ver. 2.0," Operator Manual, 70 pages, Apr. 1995.
http://www.tcsbasys.com/products/superstats.asp, TCS/Basys Controls: Where Buildings Connect With Business, 2 pages, printed Aug. 26, 2003.
http://www.tcsbasys.com/products/sz1009.asp, TCS/Basys Controls: Where Buildings Connect With Business, 1 page, printed Aug. 26, 2003.
http://www.tcsbasys.com/products/sz1017a.asp, TCS/Basys Controls: Where Buildings Connect With Business, 1 page, printed Aug. 26, 2003.
http://www.tcsbasys.com/products/sz1017n.asp, TCS/Basys Controls: Where Buildings Connect With Business, 1 page, printed Aug. 26, 2003.
http://www.tcsbasys.com/products/sz1020nseries.asp, TCS/Basys Controls: Where Buildings Connect With Business, 2 pages, printed Aug. 26, 2003.
http://vvww.tcsbasys.com/products/sz1020series.asp, TCS/Basys Controls: Where Buildings Connect With Business, 2 pages, printed Aug. 26, 2003.
http://www.tcsbasys.com/products/sz1022.asp, TCS/Basys Controls: Where Buildings Connect With Business, 2 pages, printed Aug. 26, 2003.
http://www.tcsbasys.com/products/sz1024.asp, TCS/Basys Controls: Where Buildings Connect With Business, 2 pages, printed Aug. 26, 2003.
http://www.tcsbasys.com/products/sz1030series.asp, TCS/Basys Controls: Where Buildings Connect With Business, 2 pages, printed Aug. 26, 2003.
http://www.tcsbasys.com/products/sz1033.asp, TCS/Basys Controls: Where Buildings Connect With Business, 2 pages, printed Aug. 26, 2003.
http://www.tcsbasys.com/products/sz1035.asp, TCS/Basys Controls: Where Buildings Connect With Business, 2 pages, printed Aug. 26, 2003.
http://www.tcsbasys.com/products/sz1041.asp, TCS/Basys Controls: Where Buildings Connect With Business, 1 page, printed Aug. 26, 2003.
http://www.tcsbasys.com/products/sz1050series.asp, TCS/Basys Controls: Where Buildings Connect With Business, 2 pages, printed Aug. 26, 2003.
http://www.tcsbasys.com/products/sz1051.asp, TCS/Basys Controls: Where Buildings Connect With Business, 2 pages, printed Aug. 26, 2003.
http://www.tcsbasys.com/products/sz1053.asp, TCS/Basys Controls: Where Buildings Connect With Business, 2 pages, printed Aug. 26, 2003.
http://wwww.tcsbasys.com/products/sz1031.asp, TCS/Basys Controls: Where Buildings Connect With Business, 2 pages, printed Aug. 26, 2003.
Trane, "System Programming, Tracer Summit Version 14, BMTW-SVP01D-EN," 623 pages, 2002.
"Keyfast Technical Overview", Corestreet Ltd., 21 pages, 2004.
U.S. Appl. No. 13/533,334, filed Jun. 26, 2012.
U.S. Appl. No. 14/129,086, filed Dec. 23, 2013.

\* cited by examiner

SYSTEMS AND METHODS FOR MANAGING VIDEO DATA

This application claims priority to Australian Patent Application No. AU 2010904999, filed on Nov. 11, 2010, entitled "SYSTEMS AND METHODS FOR MANAGING VIDEO DATA", which is incorporated herein by reference.

TECHNICAL FIELD

The present invention relates to systems and methods for managing video data. Embodiments of the invention have been particularly developed for managing operational characteristics of one or more Digital Video Management (DVM) systems. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Digital Video Management (DVM) systems, such as those based on the Honeywell DVM model, are widely used. In overview, a plurality of cameras are assigned to a plurality of camera servers, with each camera server being configured to make available (for live viewing or recording purposes) video data from an assigned one or more cameras. The camera servers are all centrally managed by a DVM database server.

Configuration of video surveillance systems is often a compromise due to the high bandwidth nature of the artifacts (network and CPU usage for live and storage for recorded video). Operator controls can counter the limitations, for example allowing an operator to manually adjust settings due to an observed situation. However, in times of high alert, video surveillance system operators are under considerable pressure to maintain situational awareness; effectively manage the circumstances of an incident; and capture sufficient data for legal and practical reasons. In such high alert situations, a requirement for manual activity creates another compromise, this time between the operator's ability to maintain his/her situational awareness, and the capturing sufficient useful data.

There is a need in the art for improved systems and methods for managing video data.

SUMMARY

It is an object of the present invention to overcome or ameliorate at least one of the disadvantages of the prior art, or to provide a useful alternative.

One embodiment provides a method for controlling a DVM system, the method including:

providing a user interface for allowing an operator to control the DVM system;

by way of the user interface, providing a system alert level controller, wherein the system alert level controller has at least two states respectively corresponding to a first system alert level and a second system alert level, wherein each system alert level is associated with a respective set of system operational characteristics;

receiving from the operator, via the system alert controller, an instruction to progress from the first system alert level to the second system alert level;

identifying the set of system operational characteristics associated with the second system alert level; and applying the set of system operational characteristics associated with the second system alert level in the DVM system such that the system adopts those operational characteristics.

One embodiment provides a DVM system configured to perform a method as described herein.

One embodiment provides a tangible non-transitive carrier medium carrying computer executable code that, when executed via one or more processes, allows the performance of a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Embodiments of the invention will now be described, by way of example only, with reference to the accompanying drawings in which.

DESCRIPTION

Described herein are systems and methods for managing video data. Embodiments are described by reference to a Digital Video Management (DVM) system, for example methods for controlling a DVM system. In overview, the present technology relates to the ability of an operator to modify a system alert level in the context of a DVM system, thereby to reduce the need for manual interaction in times of high alert. This may be achieved by implementing a system alert level controller via a graphical user interface. Increasing the system alert level, at least in some embodiments, correspondingly increases system resource consumption, for example by automating various actions (such as record) or increasing the amount/quality of recordings made. In effect, the system is temporarily operated on a high-cost basis thereby to assist manage risk during times of high alert by reducing reliance on the operator.

One such method includes providing a user interface for allowing an operator to control the DVM system, such as a user interface rendered via a web-browser application. The user interface provides a system alert level controller, which allows the user to control a system alert level. There may be two or more such levels (i.e the system alert level controller has at least two states respectively corresponding to a first system alert level and a second system alert level). Each system alert level is associated with a respective set of system operational characteristics. The system receives from the operator, via the system alert controller, an instruction to progress from the first system alert level to the second system alert level, and identifies a set of system operational characteristics associated with the second system alert level. These are subsequently applied in the DVM system, such that the system adopts those operational characteristics.

System Level Overview

Figure 1:
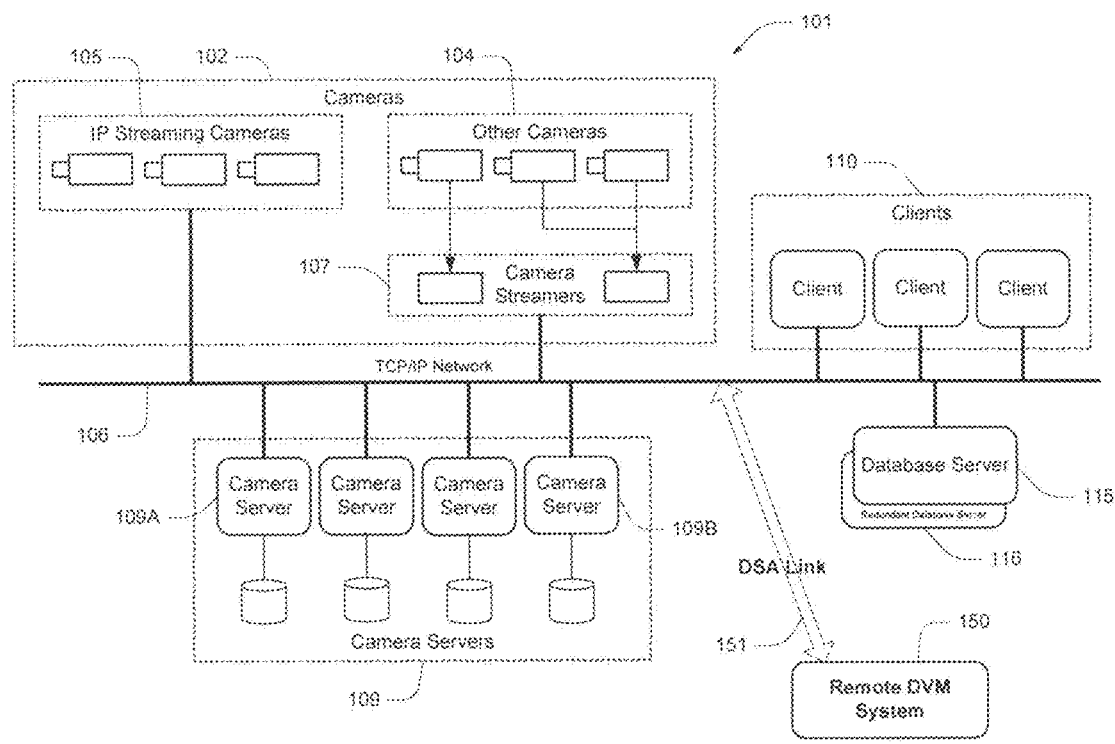
FIG. 1 schematically illustrates a DVM system according to one embodiment.

FIG. 1 illustrates a general Digital Video Management (DVM) system 101. System 101 is described to provide general context to various embodiments discussed below. Although embodiments are described by reference to DVM systems based on system 101, the present invention is not limited as such. That is, system 101 is provided as a general example to highlight various features of an exemplary DVM system. In practice, many systems omit one or more of these features, and/or include additional features.

System 101 includes a plurality of video streaming units 102. Units 102 include conventional cameras 104 (including analogue video cameras) coupled to discrete video streaming units, and IP streaming cameras 105. Video streaming units 102 stream video data, presently in the form of surveillance footage, on a TCP/IP network 106. This is readily achieved using IP streaming cameras 105, which are inherently adapted for such a task. However, in the case of other cameras 104 (such as conventional analogue cameras), a discrete video streaming unit 107 is required to convert a captured video signal into a format suitable for IP streaming.

For the purposes of the present disclosure, the term "video streaming unit" should be read to include IP streaming cameras 105 and video streaming units 107. That is, the term "video streaming unit" describes any hardware component configured to stream video data onto a network, independent of the source of the originating analogue video data.

For the present purposes, the terms "video streaming unit" and "camera" are generally used interchangeably, on the assumption that each video streaming unit corresponds to a unique set of optical components used to capture video. That is, there is a one-to-one relationship between streaming units 107 and cameras 104. However, in other embodiments there is a one-to-many relationship between streaming units 107 and cameras 104 (i.e. a streaming unit is configured for connection to multiple cameras).

One or more camera servers 109 are also connected to network 106 (these may be either physical servers or virtual servers). Each camera server is enabled to have assigned to it one or more of video streaming units 102. In some embodiments the assignment is on a stream-by-stream basis rather than a camera-by-camera basis. This assignment is carried out using a software-based configuration tool, and it follows that camera assignment is virtual rather than physical. That is, the relationships are set by software configuration rather than hardware manipulation. In practice, each camera has a unique identifier. Data indicative of this identifier is included with surveillance footage being streamed by that camera such that components on the network are able to ascertain from which camera a given stream originates.

In the present embodiment, camera servers are responsible for making available both live and stored video data. In relation to the former, each camera server provides a live stream interface, which consists of socket connections between the camera manager and clients. Clients request live video through the camera server's COM interfaces and the camera server then pipes video and audio straight from the relevant streaming unit to the client through TCP sockets. In relation to the latter, each camera server has access to a data store for recording video data. Although FIG. 1 suggests a one-to-one relationship between camera servers and data stores, this is by no means necessary. Each camera server also provides a playback stream interface, which consists of socket connections between the camera manager and clients. Clients create and control the playback of video stored that the camera server's data store through the camera manager's COM interfaces and the stream is sent to clients via TCP sockets.

Although, in the context of the present disclosure, there is discussion of one or more cameras or streaming units being assigned to a common camera server, this is a conceptual notion, and is essentially no different from a camera server being assigned to one or more cameras or streaming units.

Clients 110 execute on a plurality of client terminals, which in some embodiments include all computational platform on network 106 that are provided with appropriate permissions. Clients 110 provide a user interface (UI) that allows surveillance footage to be viewed in real time by an end-user. For example, one UI component is a render window, in which streamed video data is rendered for display to a user. In some cases this user interface is provided through an existing application (such as Microsoft Internet Explorer), whilst in other cases it is a standalone application. The user interface optionally provides the end-user with access to other system and camera functionalities, including mechanical, digital and optical camera controls, control over video storage, and other configuration and administrative functionalities (such as the assignment and reassignment of cameras to camera servers). Typically clients 110 are relatively "thin", and commands provided via the relevant user interfaces are implemented at a remote server, typically a camera server. In some embodiments different clients have different levels of access rights. For example, in some embodiments there is a desire to limit the number of users with access to change configuration settings or mechanically control cameras.

System 101 also includes a DVM database server 115. Database server 115 is responsible for maintaining various information relating to configurations and operational characteristics of system 101, and for managing events within the system. In terms of events, the general notion is that an action in the system (such as the modification of data in the database, or the reservation of a camera, as discusses below) causes an event to be "fired" (i.e. published), this having follow-on effects depending on the nature of the event.

In the present example, the system makes use of a preferred and redundant database server (115 and 116 respectively), the redundant server essentially operating as a backup for the preferred server. The relationship between these database servers is generally beyond the concern of the present disclosure.

Some embodiments of the present invention are directed to distributed DVM systems, also referred to as "distributed system architecture" (DSA). In general terms, a distributed DVM system includes a plurality of (i.e. two or more) discrete DVM systems, such as system 101. These systems are discrete in the sense that they are in essence standalone systems, able to function autonomously without the other by way of their own DVM servers. They may be distributed geographically (for example in different buildings, cities or countries), or notionally (in a common geographic location, but split due to individual system constraints, for example camera server numbers, or simply to take advantage of benefits of a distributed architecture). In the context of FIG. 1, a remote system 150, communicates with the local system via a DSA link 151. For the present purposes, it is assumed that remote system 150 is in a general sense similar to the local system. Various components (hardware and software) are configured to allow communications between the systems, for example via a network connection (including, but not limited to, an Intranet or Internet connection), or other communications interface. For the sake of the present embodiments, it is assumed that the inter-system communications occur by way of TCP/IP connections, and in this manner any communications channel supporting TCP/IP may be used.

System Alert Level Control

Figure 2:
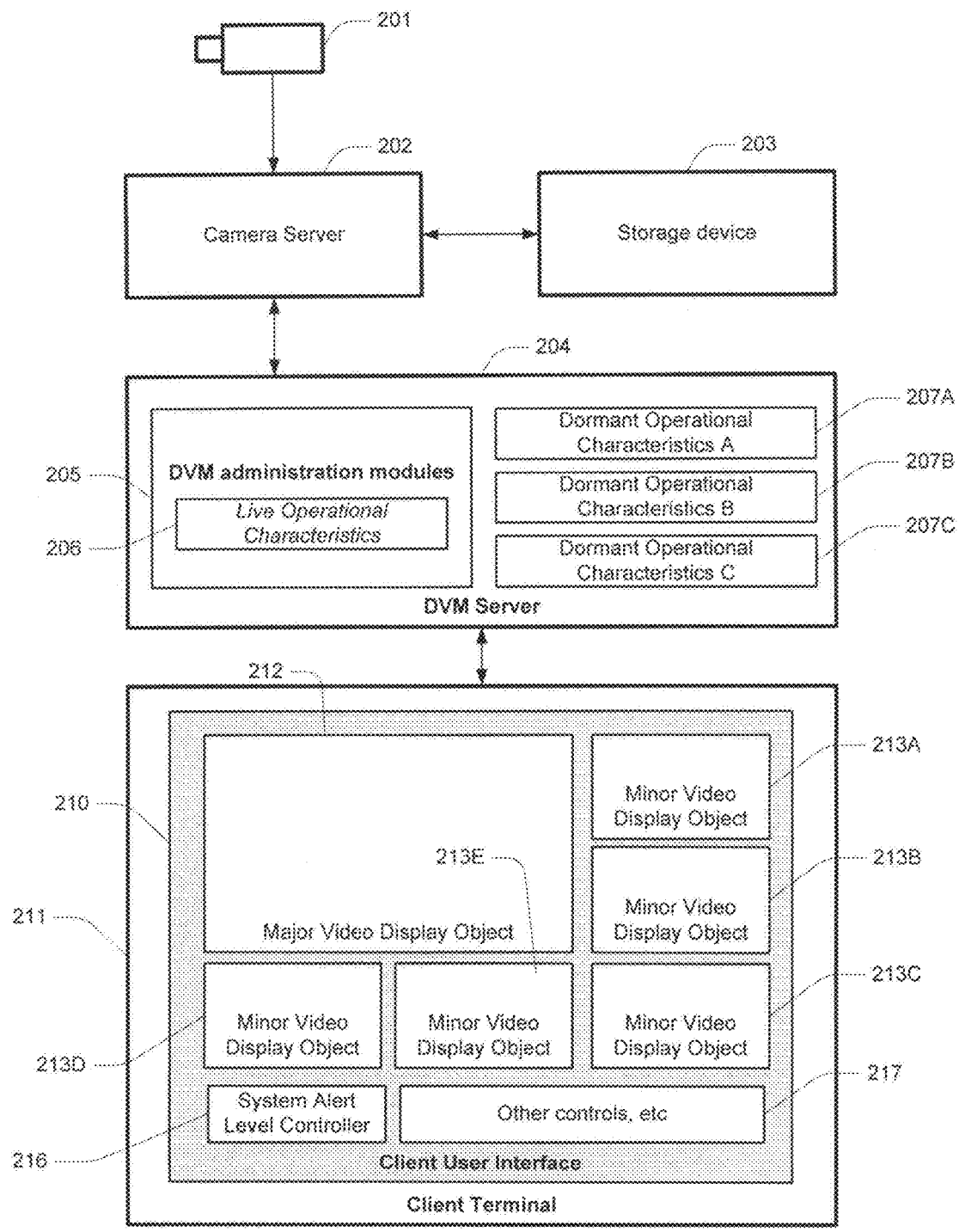
FIG. 2 schematically illustrates a DVM system according to one embodiment.

FIG. 2 illustrates components of an exemplary DVM system (such as the system of FIG. 1), but simplified to illustrate components relevant to the provision of system alert level control.

A camera 201 is associated with a camera server 202. Camera server 202 is configured to access video data made available by camera 201, either for live viewing or for recording to a storage device 203. Camera server 202 is configured/controlled by a DVM server 204. DVM server 204 executes DVM administration modules 205. The functional block for modules 205 is used to simplistically represent a wide range of software components implemented within a DVM system.

Modules 205 are presently configured to apply a set of operational characteristics 206 in the DVM system. Modules 205 may also be configured to apply other sets of operational characteristics 207A-C, which are "dormant" in the example of FIG. 2. In essence, each set of operational characteristics (206 and 207A-C) is defined by a set of data and/or instructions which allow a configuration module to apply those characteristics in the DVM system. For example, a plurality of sets of operational characteristics are stored in a database, and a configuration module provided with the necessary instructions to allow the implementation of those operational characteristics in the DVM system. The characteristics are "applied" in the sense that the instructions have been followed, thereby to configure the relevant components. The characteristics may include camera settings (including capture and positional characteristics), record characteristics (such resolution, precord, frame rate and the like), and system rules (for example the manner by which the system responds to triggered events). A number of examples are discussed further below.

DVM server 204 communicates with a user interface 210 which executes on a client terminal 211. In the present embodiment, this user interface is provided via module 205 via a web-server type arrangement (i.e. user interface 210 is provided via a web-browser at terminal 211 which renders data transmitted by server 204).

User interface 210 is configured to display live and recorded video data to a user via a video display objects. In the example of FIG. 2, a plurality of display objects are shown as being rendered on-screen simultaneously, including a major display object 212 and minor display objects 213A-E. These are configured to each display live video data from respective cameras (such as camera 201). User interface 210 additionally includes a system alert level controller 216 and other controls 217 (which simplistically represents a variety of GUI controls available to an operator of terminal 211, such as record control, camera position control, camera view selection, and so on).

The system alert level controller may take a variety of forms, such as a switch (for instance where there are two states) or a slider (where there are multiple states, each increasing in level), or simply a "panic button". The crux is that an operator is able to manipulate controller 216 thereby to change the system alert level quickly and easily.

Figure 3:
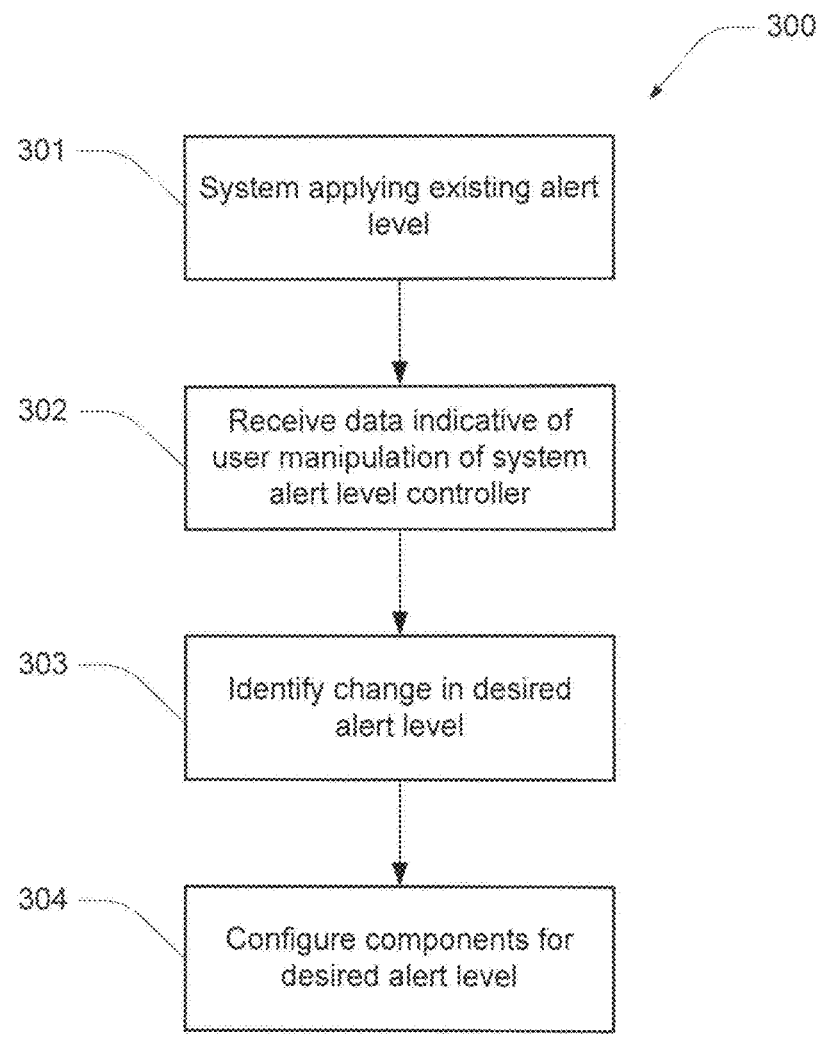
FIG. 3 illustrates a method according to one embodiment.

FIG. 3 illustrates a method 300 according to one embodiment, performed by DVM server 204. At 301, a DVM system applies an existing system alert level. That is, the system's components are configured to apply a set of operational characteristics associated with that existing alert level. At 302 data is received, the data being indicative of user manipulation of the system alert level controller. From this data, the desired change in alert level is determined at 303. This allows identification of data indicative of the set of operational characteristics associated with the desired level. That data is used at 304 to implement the desired system alert level in the DVM system (by configuring the relevant components to implement the associated operational characteristics).

As context, configuration of video surveillance systems is often a compromise due to the high bandwidth nature of the artifacts (network and CPU usage for live and storage for recorded video). Whilst, in a resource-unlimited world, it would be ideal to record all video data at high quality, that is unrealistic in practice. In practice, recording is controlled by schedules, event-based triggers, and operator controls. This assists in limiting the amount of video data that is recorded, whilst seeking to ensure that important data is recorded.

Operator controls allow an operator to manually adjust settings and control recording based on what he/she observes. Accordingly, this presents an efficient manner to managing resources. However, there is a limit to an operator's abilities (even in spite of sophisticated GUI design), and in times of high alert the manual controls may become a hindrance rather than help. The present system alert level controller is intended to manage such complications, by allowing the operator to increase the system alert level, and correspondingly reduce the need to manual interaction.

In terms of system alert levels, one approach is for under the first system alert level one or more actions to be manually effected, and under the second system alert level the same one or more actions to be automatically effected. For instance:

In some embodiments increasing the alert level automates recording at one or more cameras. For example, one approach is to automate recording at any of the one or more cameras being viewed by the operator (via the terminal and/or display walls). Another approach is to automate recording at any camera where motion is detected (for example using video analytical software). These forms of automated recording are optionally extended to include geospatially related cameras (for instance recording at cameras being viewed, and cameras geospatially related to those cameras.

In some embodiments increasing the alert level automates repositioning of one or more cameras. For example, the set of operational characteristics may include "high alert positions" for one or more cameras (defined in terms of pan/tilt/zoom from a predefined origin), and applying those characteristics includes automatically repositioning those cameras to their respective "high alert positions". These may, for example, assist in monitoring of sensitive resources, doors, or the like.

In some embodiments increasing the alert level automates adjustment of recording settings. Recording settings may include one or more of resolution, frame rate, image compression, precord times (period of time prior buffered to allow recording in hindsight), clip deletion/retention timeframe, and disk usage preferences.

In some embodiments increasing the alert level results in the DVM system generating commands to external components, for example in terms of sending messages to other systems. For example, in one embodiment an increase in system alert level notifies specified parties, such as security or law enforcement personnel.

Generally speaking, a higher system alert level is associated with a set of operational characteristics that are more resource intensive than those associated with a relatively lower system alert level. As noted, there may be as few as two levels, or more than two levels tiered in terms of system automation.

In some embodiments the system alert level controller is able to be actuated by a signal from an external device, as opposed to being actuated solely by direct action with a GUI. For example, one embodiment makes use of a physical panic button. Other embodiments use devices that monitor other conditions, thereby to make an automated assessment as to whether a change in system alert level should be affected. For example, these may monitor system conditions (for example rapidness of operator activity in the interface) or one or more monitors that sense characteristics of the operator. In terms of the latter, one embodiment makes use of a heart rate monitor that senses the heart rate of an operator, thereby to make an automated assessment as to whether the system alert level should be increased. That is, when the operator is under stress, that will be reflected by an increase in heart rate, suggesting a need to increase the system alert level and thereby automate various actions.

There may be various other modifications to operational characteristics associated with changes in system alert level. For example, in one embodiment the DVM system implements a camera control reservation system, and increasing alert level temporarily prioritizes the relevant operator in terms of that reservation system.

Conclusions And Interpretation

It will be appreciated that the disclosure above provides various significant systems and methods for managing video data. For example, the present embodiments allows for improved control of DVM systems, thereby to retain advantages associated with manual control during normal times, yet mitigating associated complications during times of high alert.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; a carrier wave bearing a propagated signal detectable by at least one processor of the one or more processors and representing the set of instructions a propagated signal and representing the set of instructions; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A method for controlling a DVM system, the method including:
   providing a user interface for allowing an operator to control the DVM system;
   by way of the user interface, providing a system alert level controller, wherein the system alert level controller has at least two states respectively corresponding to a first system alert level and a second system alert level, wherein each system alert level is associated with a respective set of system operational characteristics;
   receiving from the operator, via the system alert controller, an instruction to progress from the first system alert level to the second system alert level;
   identifying the set of system operational characteristics associated with the second system alert level;
   applying the set of system operational characteristics associated with the second system alert level in the DVM system such that the system adopts those operational characteristics; and
   wherein the set of system operational characteristics associated with the second system alert level configure the DVM system to identify one or more cameras for which live video data is being displayed to the operator, and automatically recording video data for that one or more cameras.

2. A method according to claim 1 wherein under the first system alert level one or more actions are manually effected, and under the second system alert level the same one or more actions are automatically effected.

3. A method according to claim 2 wherein the one or more actions include recording at one or more cameras.

4. A method according to claim 1, wherein the set of system operational characteristics associated with the second system alert level configure the DVM system to identify one or more cameras for which live video data is being displayed to the operator and one or more further cameras related those one or more cameras, and automatically recording video data for that one or more cameras.

5. A method according to claim 4 wherein the one or more further cameras are geospatially related to the one or more cameras for which live video data is being displayed to the operator.

6. A method according to claim 2 wherein the one or more actions include repositioning of one or more cameras.

7. A method according to claim 2 wherein the one or more actions include adjusting recording settings.

8. A method according to claim 7 wherein adjusting recording settings includes one or more of resolution, frame rate, image compression, precord times, clip deletion/retention timeframe, and disk usage preferences.

9. A method according to claim 1 wherein the second system alert level is associated with a set of operational characteristics that are more resource intensive than those associated with the first system alert level.

10. A method according to claim 9 wherein resource intensity includes one or more of resolution, frame rate, image compression, precord times, clip deletion/retention timeframe, and disk usage preferences.

11. A method according to claim 1 wherein there are more than two states respectively corresponding to system alert levels, wherein each system alert level is associated with a respective set of system operational characteristics.

12. A method according to claim 11 wherein the states are tiered in terms of system automation.

13. A method according to claim 1 wherein switching between the at least two states allows an operator to reduce the need for manual interaction with the DVM system during times of high alert.

14. A method according to claim 1 wherein the system alert level controller is controlled by a signal from a remote device.

15. A method according to claim 14 wherein the remote device includes any one or more of: a physical panic button; a heart rate monitor that senses the heart rate of an operator; and one or more other monitors that sense characteristics of the operator.

16. A DVM system, comprising:
   a user interface;
   a system alert level controller in communication with the user interface, the system alert level controller having at least two states respectively corresponding to a first system alert level and a second system alert level, and wherein each system alert level is associated with a respective set of system operational characteristics;
   the system alert controller configured to receive from the user interface an instruction to progress from the first system alert level to the second system alert level;
   the system alert controller configured to identify the set of system operational characteristics associated with the second system alert level;
   the system alert controller configured to apply the set of system operational characteristics associated with the second system alert level in the DVM system such that the DVM system adopts those operational characteristics; and
   wherein the set of system operational characteristics associated with the second system alert level configure the DVM system to identify one or more cameras for which live video data is being displayed to the operator, and automatically recording video data for that one or more cameras.

17. A DVM system according to claim 16 including:
   a plurality of camera servers, wherein each camera server is configured to utilise video data from an assigned one or more video streaming units; and
   a plurality of video streaming units, wherein each streaming unit is configured to stream, onto a network, video data for a respective camera.

18. A DVM system, comprising:
   a user interface;
   a system alert level controller in communication with the user interface, the system alert level controller having at least two states respectively corresponding to a first system alert level and a second system alert level, wherein each system alert level is associated with a respective set of system operational characteristics, and wherein under the first system alert level one or more actions are manually effected, and under the second system alert level the same one or more actions are automatically effected;
   the system alert controller configured to receive from the user interface an instruction to progress from the first system alert level to the second system alert level;
   the system alert controller configured to identify the set of system operational characteristics associated with the second system alert level;
   the system alert controller configured to apply the set of system operational characteristics associated with the second system alert level in the DVM system such that the DVM system adopts those operational characteristics; and wherein the set of system operational characteristics associated with the second system alert level configure the DVM system to identify one or more cameras for which live video data is being displayed to the operator, and automatically recording video data for that one or more cameras.

19. A DVM system according to claim 16 wherein the set of system operational characteristics associated with the second system alert level configure the DVM system to identify one or more cameras for which live video data is being displayed to the operator and one or more further cameras related those one or more cameras, and automatically recording video data for that one or more cameras.

20. A DVM system according to claim 19 wherein the one or more further cameras are geospatially related to the one or more cameras for which live video data is being displayed to the operator.

\* \* \* \* \*